(12) United States Patent
Kim et al.

(10) Patent No.: US 7,587,451 B2
(45) Date of Patent: Sep. 8, 2009

(54) DYNAMIC FOLDER BROWSING METHOD USING BLUETOOTH AND SYSTEM FOR THE SAME

(75) Inventors: Eun-Chul Kim, Suwon-si (KR); Khi-Soo Jeong, Hwaseong-si (KR); Young-Sin Moon, Suwon-si (KR); Bi-Won Ji, Seoul (KR); Hyo-Jin Kim, Suown-si (KR); Hyun-Jeong Shim, Seoul (KR)

(73) Assignee: Samsung Electronics Co., Ltd (KR)

( * ) Notice: Subject to any disclaimer, the term of this patent is extended or adjusted under 35 U.S.C. 154(b) by 376 days.

(21) Appl. No.: 11/708,658

(22) Filed: Feb. 20, 2007

(65) Prior Publication Data
US 2007/0214278 A1    Sep. 13, 2007

(30) Foreign Application Priority Data
Feb. 20, 2006    (KR) .................. 10-2006-0016461

(51) Int. Cl.
*G06F 15/16*    (2006.01)
*G06F 12/00*    (2006.01)

(52) U.S. Cl. ...................................... 709/203; 709/227

(58) Field of Classification Search ................. 709/203, 709/227–229, 217–219
See application file for complete search history.

(56) References Cited

U.S. PATENT DOCUMENTS

| | | | | |
|---|---|---|---|---|
| 6,031,529 A | * | 2/2000 | Migos et al. | 715/783 |
| 6,483,525 B1 | * | 11/2002 | Tange | 715/765 |
| 6,707,468 B2 | * | 3/2004 | Tange | 715/739 |
| 2002/0120775 A1 | * | 8/2002 | Tange | 709/245 |
| 2004/0059799 A1 | * | 3/2004 | Kobata | 709/219 |

* cited by examiner

*Primary Examiner*—Zarni Maung
(74) *Attorney, Agent, or Firm*—The Farrell Law Firm, LLP (57) ABSTRACT

Provided is a function for more efficiently pulling files in a browsing folder is implemented. A client pulls folder lists items in a basis of a number displayable on a screen thereof by subdividing a process pulling the folder lists items. In detail, a new operation is defined between a client and a server, wherein the client receives a total number of folder lists items from the server, and the server receives a displayable number of folder lists items from the client. Thereafter, the client pulls folder lists items corresponding to the displayable number defined by the client from among the total folder lists items using packets such as start, forward, backward, and end.

14 Claims, 6 Drawing Sheets

DYNAMIC FOLDER BROWSING METHOD USING BLUETOOTH AND SYSTEM FOR THE SAME

PRIORITY

This application claims priority under 35 U.S.C. § 119 to an application entitled "Dynamic Folder Browsing Method Using Bluetooth® and System For The Same" filed in the Korean Intellectual Property Office on Feb. 20, 2006 and assigned Serial No. 2006-16461, the contents of which are incorporated herein by reference.

BACKGROUND OF THE INVENTION

1. Field of the Invention

The present invention relates generally to a Bluetooth® communication method, and in particular, to a dynamic folder browsing method using Bluetooth® to more efficiently pull files in a browsing folder and a system for the same.

2. Description of the Related Art

Bluetooth® is a system for wirelessly interconnecting portable devices including various digital devices in close proximity to each other with low cost. Bluetooth® is a representative wireless communication technology of a personal area network (PAN) for transferring voice and data in communication between various digital devices without physical cable using a radio frequency (RF). For example, by implementing Bluetooth® wireless technology in mobile phones and personal computers (PCs), the mobile phones and PCs can be wirelessly connected, and all digital devices, such as personal digital assistants (PDAs), desktop computers, facsimiles, keyboards, joysticks, and etc, can constitute a part of a Bluetooth® system.

Since Bluetooth® technology supports a low power mode, therefore, it is primarily implemented in portable devices. The use of Bluetooth® technology thereby increases convenience of life. Additionally, since the Bluetooth® technology uses a 2.4 GHz industry scientific medical (ISM) frequency at a maximum 1 Mbps~3 Mbps rate, additional charge, such as information use charge, does not exist.

Figure 1:
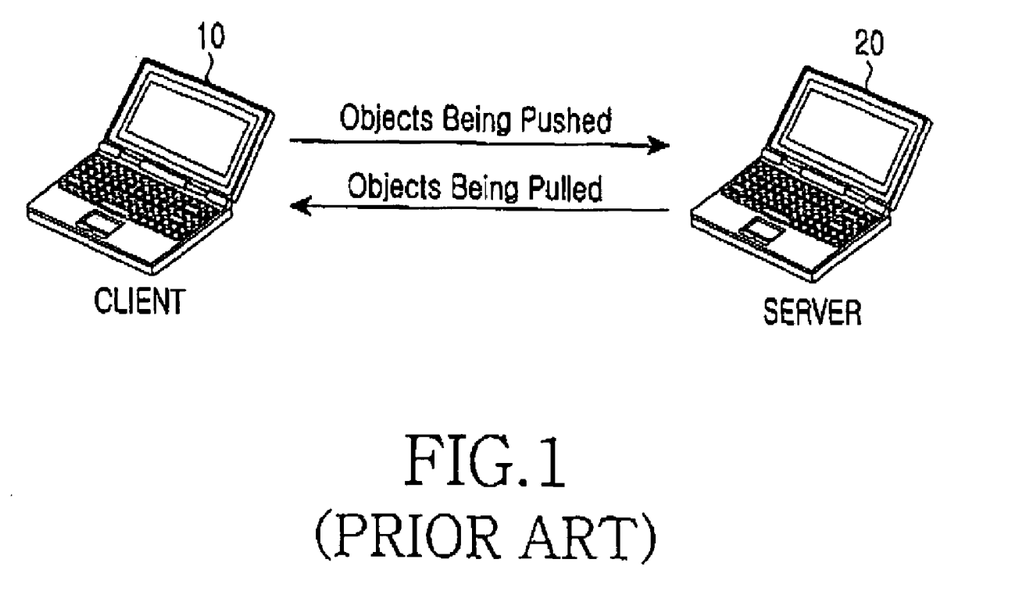
FIG. 1 illustrates a conventional data flow between a client and a server.

Mobile Bluetooth® devices, i.e., mobile communication terminals, perform service, functions corresponding to Bluetooth® service profiles. In particular, data transmission related to file transfer and file browsing is performed according to a File Transfer Profile (FTP). This data transmission process will be described herein with reference to FIG. 1. FIG. 1 illustrates a conventional data flow between a client 10 and a server 20.

As illustrated in FIG. 1, the client 10 can push objects selected by a user to the server 20 and pull selected objects from the server 20. The client 10 must transmit data according to a Generic Object Exchange Profile (GOEP) specification and display folder lists items to the user according to an Object Exchange protocol (OBEX) folder listing format. The server 20 is a target device of the client 10 and must support folder browsing according to an object exchange server and the OBEX folder listing format.

The FTP supports three main functions. A folder browsing function is a function allowing the client 10 to display objects and sub-folders in a root folder of the server 20 from when the client 10 is connected to the server 20. An object transfer function is a function of pulling or deleting selected files or folders after folder browsing is performed. An object operation function defines a series of operations for creating or deleting files or folders in the server 20.

Figure 2:
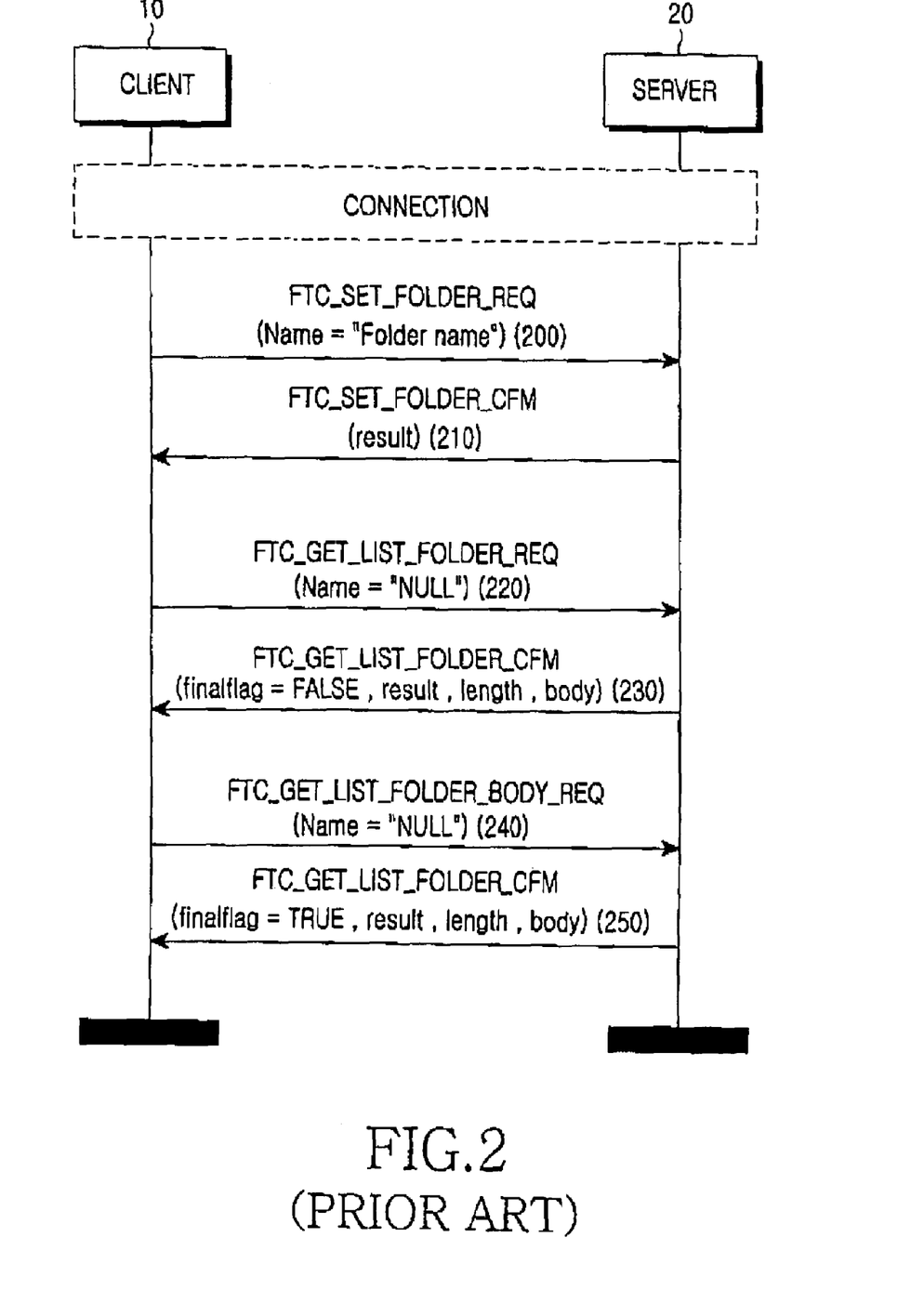
FIG. 2 is a signaling diagram illustrating a conventional folder browsing process between a client and a server.

The folder browsing function will now be described in more detail. The folder browsing function can be divided into a process of pulling a file list in a folder and a process of setting a folder to be browsed. FIG. 2 is a signaling diagram illustrating a conventional folder browsing process between the client 10 and the server 20.

In order to pull a file list in a folder, a packet 'get folder list' is used, and the file list in the folder can be pulled using a get operation defined in the GOEP. For achieving this result, the client 10 and the server 20, i.e., a user device and a target device, must be connected after a paging process.

Thereafter, referring to FIG. 2 the client 10 accesses a root folder of the server 20 in steps 200 and 210 and pulls a file list in a selected folder from the server 20 in steps 220 to 250. Since the server 20 can transfer data within a range of a transfer amount defined in the FTP, if a file list to be transferred exceeds the transferable amount, the server 20 transfers the file list to the client 10 by dividing the file list in a basis of the transferable amount. Steps 220 to 250 show a process of transferring the file list in twice.

In terms of processing speed of the conventional folder browsing function, if the number of files in a selected folder of the server 20 exceeds, for example, 100, a long time is required for the server 20 to get names of the files and build the file names in a transferable format. In addition, in terms of memory, since the client 10 pulls a total file list from the server 20, the client 10 requires a memory space to store the file list.

As described above, a time delay may occur in terms of processing speed of the conventional folder browsing function. For example, when a user wants to list around 100 files using an extensible markup language (XML) builder of a mobile Bluetooth® device, around 3~4 seconds are taken. If the user wants to list more than 100 files, folder browsing may fail due to time-out. When the user wants to list more than 400 files, time-out may occur. Furthermore, a parsing process requiring approximately 2~3 seconds corresponding to half of a builder-speed is necessary in a server. Thus, the greater the number of files to be listed the longer the time taken for file browsing.

In addition, since a client pulls a total file list, if 400 files are pulled, a memory space of 400*512 bytes is necessary in the client, and 400*512 bytes correspond to a data size difficult for a mobile Bluetooth® device having a small memory space to process.

SUMMARY OF THE INVENTION

An object of the present invention is to substantially solve at least the above problems and/or disadvantages as well as to provide at least the advantages set forth below. Accordingly, an object of the present invention is to provide a dynamic folder browsing method using Bluetooth® to more efficiently pull files in a browsing folder and a system for the same.

According to another aspect of the present invention, there is provided a dynamic folder browsing method using Bluetooth® technology, the method includes requesting, by a client, a server to set a path for folder browsing according to a pre-set profile; if the server supports a division transfer function at a path set time, transmitting a packet to pull folder lists items corresponding to a number displayable on a single screen according to the pre-set profile; and if the folder lists items corresponding to the number displayable on a single screen is received, displaying the received folder lists items on a browsing screen.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention implements a function for more efficiently pulling files in a browsing folder. In the present invention, a client pull folder lists items a basis of a number displayable on a display screen thereof by subdividing a process of pulling the folder lists items. In detail, the present invention defines a new operation between a client and a server, wherein the client receives a total number of folder lists items from the server, and the server receives a displayable number of folder lists items from the client. Thereafter, the client pulls folder lists items corresponding to the displayable number defined by the client from among the total folder lists items using packets such as start, forward, backward, and end. By so doing, a speed in file browsing significantly increases, and since a memory space corresponding to the displayable number is assigned, a memory can be used more efficiently.

Figure 3A:
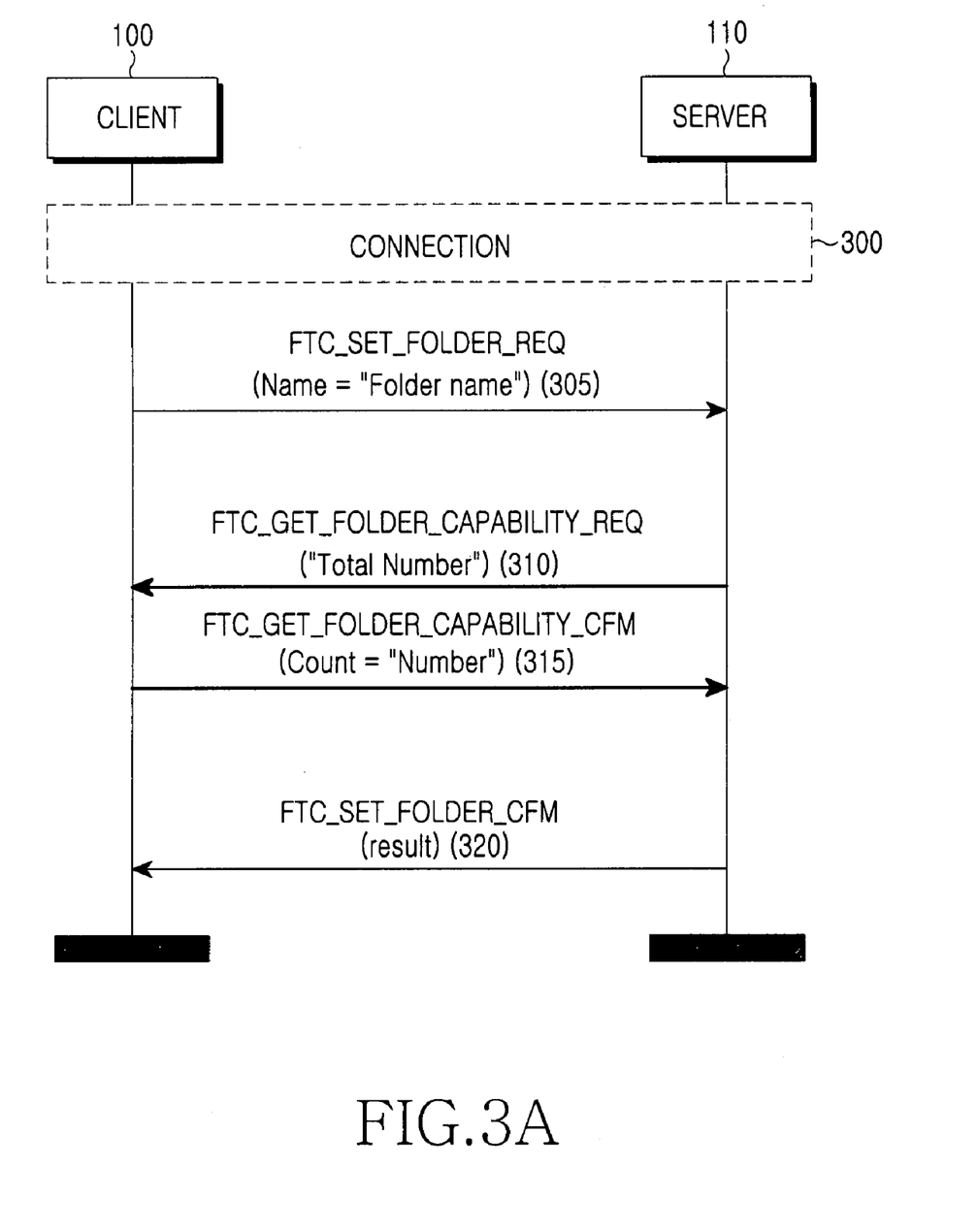
FIG. 3A is a signaling diagram illustrating a dynamic folder browsing process between a client and a server according to the present invention.

FIG. 3A is a signaling diagram illustrating a dynamic folder browsing process between a client 100 and a server 110 according to the present invention. Therein, the client 100 is a user device, and the server 110 is a target device. In addition, although a case of pulling folder lists items by dividing the folder lists items when folder browsing is performed is illustrated in the present invention, the present invention also can be applied to a process of pulling a list of files.

Referring to FIG. 3A, the client 100 can set a path with the server 110 when a File Time Code (FTC) connection is achieved in step 300. Thereafter, the client 100 transmits a packet to the server 110 to get folder lists items. In a packet transmitted from the client 100 to the server 110 in order to get folder lists items, header information of the packet includes a connection identification (ID), a type header and a name header, as well as a folder name can be included using the name header. In step 305, the client 100 transmits a packet FTC_SET_FOLDER_REQ in which a folder name is designated to the server 110. That is, when the FTC connection is achieved, the client 100 must browse and provide folder lists items of a root folder.

If the server 110 supports a function of dividing and transmitting total folder lists items, the server 110 transmits a packet FTC_GET_FOLDER_CAPABILITY_REQ to the client 100 in step 310 to request for a division unit of the folder lists items. That is, the server 110 requests the client 100 for a transfer unit of the folder lists items. Herein, the server 110 also transmits a total number of the folder lists items to the client 100 by inserting the total number of the folder lists items into the packet FTC_GET_FOLDER_CAPABILITY_REQ. By so doing, the client 100 can predict a total number of folder lists items to be stored or pulled based on the received total number of the folder lists items.

In step 315, the client 100 transmits a packet FTC_GET_FOLDER_CAPABILITY_CFM containing a displayable listing number, i.e., a folder listing number, to the server 110. Table 1 illustrates a structure of the packets FTC_GET_FOLDER_CAPABILITY_REQ and FTC_GET_FOLDER_CAPABILITY_CFM.

TABLE 1

| Header/Field | Name |
| --- | --- |
| Field | Connection ID |
| Field | Folder list count |
| Field | Total list count |

As illustrated in Table 1, for the purpose of communication between the client 100 and the server 110, a Bluetooth® connection ID is included in each packet, and a field in which the number of folder lists items is set so that the client 100 can pull a designated number of folder lists items from the server 110 and a field in which the total number of folder lists items is set are also included. Thus, the server 110 transmits the packet FTC_GET _FOLDER _CAPABILITY _REQ in which the total number of folder lists items belonging to the server 110 is set in a total list count field to the client 100. In response to the packet FTC_GET_FOLDER_CAPABILITY_REQ, the client 100 transmits the packet FTC_GET_FOLDER_CAPABILITY_CFM in which the number of folder lists items displayable on a single screen of the client 100 is set in a folder list count field to the server 110.

When the server 110 receives the packet FTC_GET_FOLDER_CAPABILITY_CFM, the server 110 can determine a division unit of folder lists items to be transmitted to the client 100 based on the received number of folder lists items displayable on a single screen of the client 100. Through the above-described procedures, negotiation of the number of folder lists items to be transmitted between the client 100 and the server 110 is performed. Upon determining the number of folder lists items to be transmitted, the server 110 transmits a packet FTC_SET_FOLDER_CFM to the client 100 to inform the client 100 that path establishment is completed, and thus, a folder path is selected.

Figure 3B:
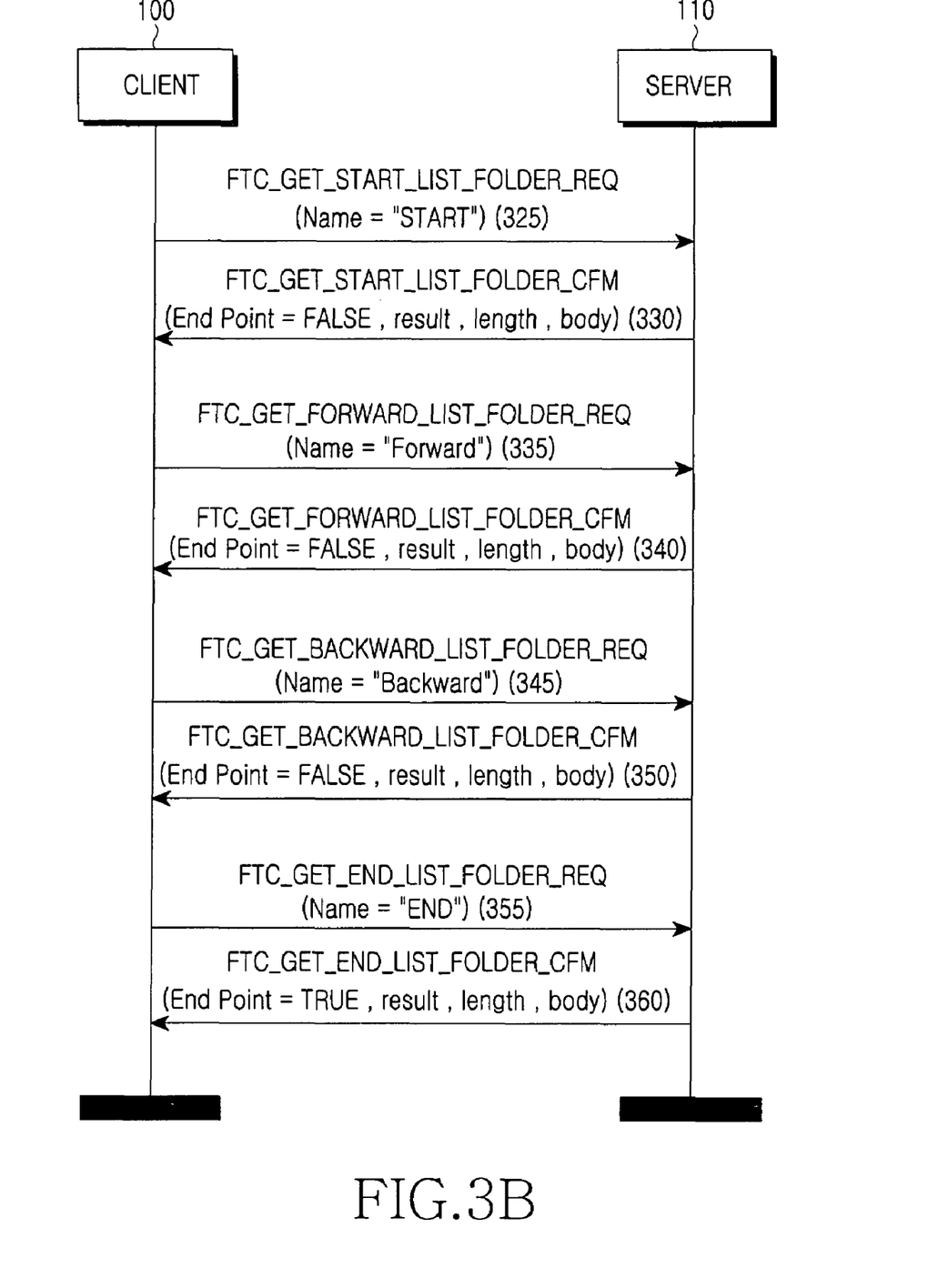
FIG. 3B is a signaling diagram illustrating a folder navigation process following the dynamic folder browsing process of FIG. 3A according to the present invention.

FIG. 3B is a signaling diagram illustrating a folder navigation process following the dynamic folder browsing process of FIG. 3A according to the present invention. Referring to FIG. 3B, the client 100 transmits a packet FTC_GET_START_LIST_FOLDER_REQ to the server 110 in step 325 to approach a start point of folder lists items. In response to the packet FTC_GET_START_LIST_FOLDER_REQ, the server 110 transmits a packet FTC_GET_START_LIST_FOLDER_CFM containing the start point and folder lists items corresponding to the number displayable on a browsing screen from the start point to the client 100 in step 330. Herein, the server 110 provides folder lists items corresponding to the folder listing number determined by the client 100. In addition, if folder lists items to be transmitted remain by excluding the currently transmitted folder lists items, the server 110 transmits the packet FTC_GET_START_LIST_FOLDER_CFM by setting a last flag thereof to 'FALSE'.

The above-described packets are used to move to the start point of the folder lists items and display a first page on the browsing screen when a user selects a 'START' operation on the browsing screen of the client 100.

Since the client 100 knows locations of currently browsed folders, the client 100 transmits a packet FTC_GET_FORWARD_LIST_FOLDER_REQ to the server 110 in step 335 to pull subsequent folder lists items. In response to the packet FTC_GET_FORWARD_LIST_FOLDER_REQ, the server 110 transmits a packet FTC_GET_FORWARD_LIST_FOLDER_CFM containing the folder lists items to be subsequently transmitted to the client 100 in step 340. That is, these packets FTC_GET_FORWARD_LIST_FOLDER REQ and FTC_GET_FORWARD_LIST_FOLDER_CFM are used for moving to a subsequent page.

In order to move to a previous page, the client 100 transmits a packet FTC_GET_BACKWARD_LIST_FOLDER_REQ to the server 110 in step 345 in order to pull previous folder lists items. In response to the packet FTC_GET_BACKWARD_LIST_FOLDER_REQ, the server 110 transmits a packet FTC_GET_BACKWARD_LIST_FOLDER_CFM containing the previous folder lists items to the client 100 in step 350. To approach last folder lists items, the client 100 transmits a packet FTC_GET_END_LIST_FOLDER_REQ to the server 110 in step 355 in order to move to the last folder lists items. In response to the packet FTC_GET_END_LIST_FOLDER_REQ, the server 110 transmits a packet FTC_GET_END_LIST_FOLDER_CFM containing the last folder lists items to the client 100 in step 360. Accordingly, the client 100 can move to the last folder lists items.

For example, if an operation for moving to a subsequent page from the first page is input by the user, the client 100 performs a forward operation. If a scroll-up operation is selected by the user in the first page, since the client 100 knows the total number of the folder lists items, the client 100 can display the last page on the screen by performing an end operation. Likewise, a backward operation can be performed after the end operation is performed, and thereafter, the client 100 can display a subsequent or previous page to the user by performing either the forward or backward operation.

Table 2 illustrates a structure of the packets FTC_GET_START_LIST_FOLDER_REQ/CFM and FTC_GET_END_LIST_FOLDER_REQ/CFM used to move to the first page and the last page of the folder lists items is illustrated.

TABLE 2

| Header/Field | Name |
| --- | --- |
| Header | Name header |
| Field | End, start point |
| Field | Result |
| Field | Length |
| Field | Body data |

In Table 2 above, a packet includes an end or start point field. The client 100 can know a current folder list location using the end or start point field, and movement to an end or start point can be easily performed based on information contained the end or start point field. The packets FTC_GET_START_LIST_FOLDER_REQ/CFM are usefully used when the user scrolls up folder lists items displayed on the browsing screen of the client 100, i.e., when a page-up operation is performed on the browsing screen of the client 100. Likewise, the packets FTC_GET_END_LIST_FOLDER_REQ/CFM are utilized when a page-down operation is performed to move to the first folder lists items.

A structure of the packets FTC_GET_FORWARD_LIST_FOLDER_REQ/CFM and FTC_GET_BACKWARD_LIST_FOLDER_REQ/CFM used to pull folder lists items subsequent and previous from browsed folder lists items is illustrated in Table 3.

TABLE 3

| Header/Field | Name |
| --- | --- |
| Header | Name header |
| Field | Middle count |
| Field | Result |
| Field | Length |
| Field | Body data |

In Table 3, a field in which a middle count is set is used to predict a currently browsing location. Using the packets FTC_GET_FORWARD_LIST_FOLDER_REQ/CFM and FTC_GET_BACKWARD_LIST_FOLDER_REQ/CFM, the client 100 provides the number of pulled folder lists items and allows the server 110 to predict a currently browsing location.

The client 100 and the server 110 transmit and receive packets according to a pre-set profile. The FTP, which is used in the present invention, will now be described below.

Figure 4:
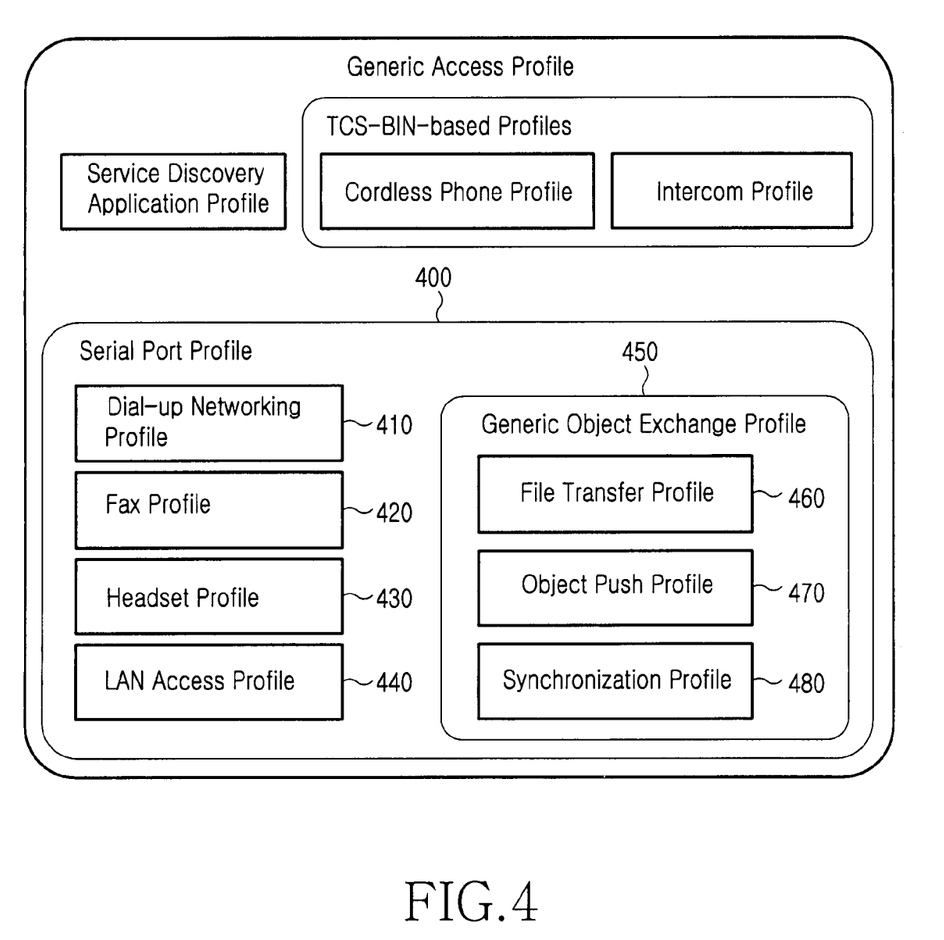
FIG. 4 is a schematic diagram illustrating a correlation between profiles in Bluetooth® communication according to the present invention.

FIG. 4 is a schematic diagram illustrating a correlation between profiles in Bluetooth® communication according to the present invention. Referring to FIG. 4, a generic access profile is a most fundamental profile. The generic access profile is related to connection and security between Bluetooth® devices. A serial port profile 400 is based on the generic access profile. Since the serial port profile 400 is used to emulate a serial cable connection, various profiles are implemented based on the serial port profile 400.

For example, a dial-up networking profile 410 for a network connection, a fax profile 420 for implementing a wireless fax, a headset profile 430 for implementing a headset to connect a personal computer (PC), a mobile communication terminal, etc. in wireless, etc., are implemented based on the serial port profile 400. Thus, fixed devices having any profile based on the serial port profile 400 use the serial port profile 400. A generic object exchange profile (GOEP) 450 is implemented based on the serial port profile 400 as an extended concept besides general communication. Based on the GOEP 450, an FTP 460 for transmitting data related to file browsing, an object push profile 470 for transmitting data related to Vobject such as VCard, VCalendar, Vnote, and Vmessage, and a synchronization profile 480 for using in serial connection of a data call, a game, or virtual Bluetooth are implemented. That is, the derivative profiles are implemented by extending the serial port profile function to realize pre-defined functions. In the present invention, data transmission is performed according to FTC.

Figure 5:
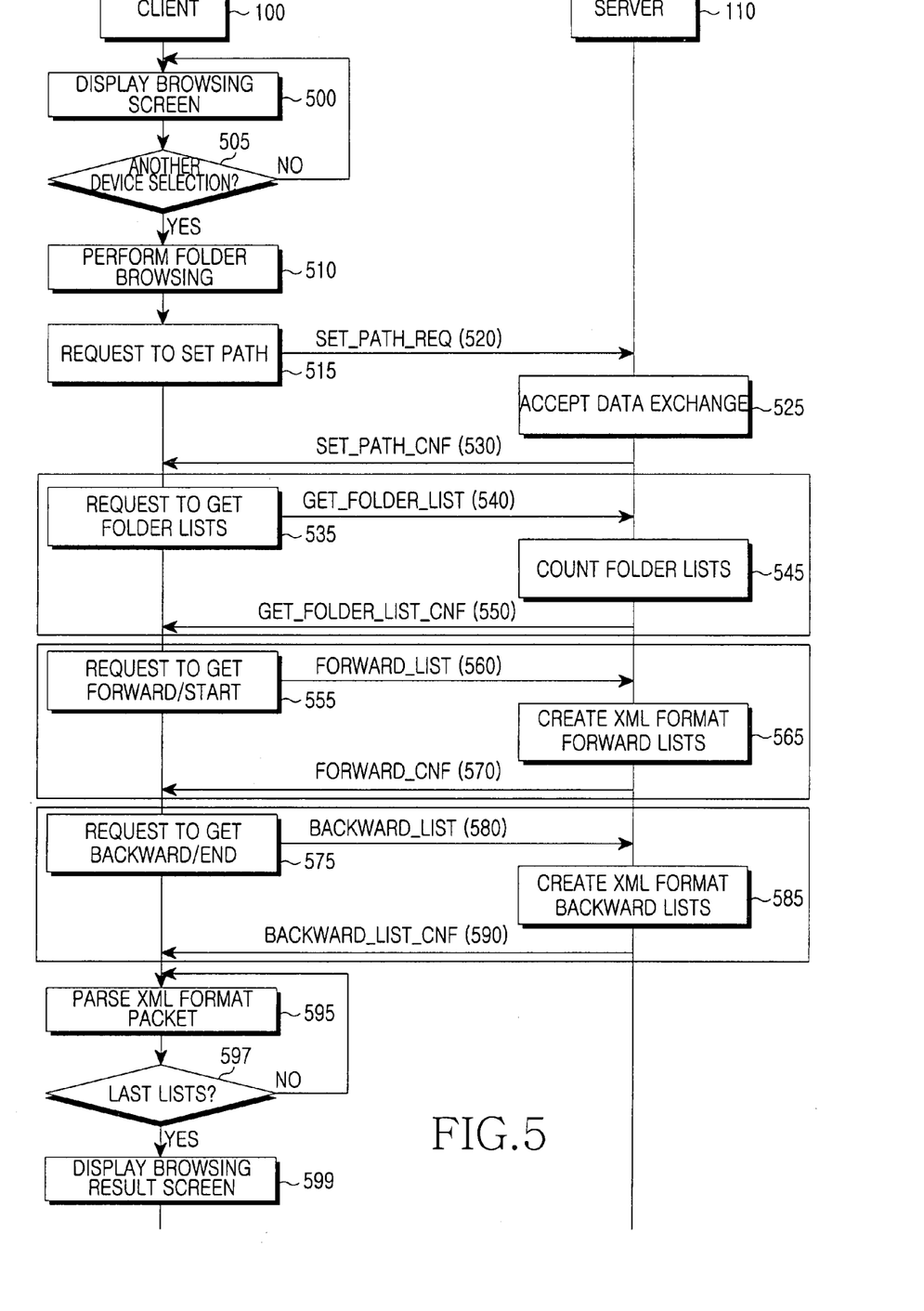
FIG. 5 is a signaling diagram illustrating a data transfer between a client and a server according to the present invention.

FIG. 5 is a signaling diagram illustrating a data transfer between a client and a server according to of the present invention. Referring to FIG. 5, the client 100 displays a browsing screen in step 500 enabling a user to perform folder browsing. The user can select a target device using the browsing screen. In step 505, the client 100 determines whether the user selects another device. If the user selects another device, in step 510 the client 100 performs folder browsing with the selected device. Herein, the device selected by the user is the server 110. For the folder browsing, the client 100 transmits an FTC set path request to obtain a location of folder lists items to be pulled in step 515 and thus transmits a packet SET_PATH_REQ to the server 110 in step 520. If the server 110 supports the division transfer function, the server 110 accepts a data exchange in step 525 and transmits a packet SET_PATH_CNF to the client 100 in step 530. As described above, when a path is set between the client 100 and the server 110, the client 100 and the server 110 exchange the number of folder lists items thereof. That is, the server 110 provides the total number of folder lists items belonging thereto to the client 100, and the client 100 provides the number of folder lists items displayable thereon to the server 110.

When the client 100 performs a get folder list request in step 535, the client 100 transmits a packet GET_FOLDER_LIST to the server 110 in step 540. In response to the packet GET_FOLDER_LIST, the server 110 sets a path, starts to count folder lists items in step 545 and transmits a packet GET_FOLDER_LIST_CNF in step 550 to provide folder lists items corresponding to the number of folder lists items displayable on the client 100. If the user inputs a request to display a previous or first page, the client 100 performs an FTC get forward/start request in step 555 to inform the server 110 of the request input. If a forward request is input, the client 100 transmits a packet FORWARD_LIST to the server 110 in step 560. In response to the packet FORWARD_LIST, the server 110 creates XML format forward lists in step 565 and transmits a packet FORWARD_CNF to the client 100 in step 570. That is, in response to the request from the client 100, the server 110 constructs and transmits requested data, i.e., folder lists items in an XML format according to the FTC.

In order to perform a get backward/end request in step 575, the client 100 transmits a packet BACKWARD_LIST to the server 110 in step 580. In response to the packet BACKWARD_LIST, the server 110 creates XML format backward lists in step 585 and transmits a packet BACKWARD_LIST_CNF to the client 100 in step 590. In step 595, the client 100 parses the packet built in the XML format and transmitted from the server 110. That is, the client 100 obtains desired data by parsing a packet transmitted from the server 110. In step 597, the client 100 determines whether the parsed folder lists items are the last lists. If the parsed folder lists items are the last lists, the client 100 displays a browsing result screen in step 599 to display files in a selected folder.

As described above, according to the present invention, by subdividing a process of pulling desired folder lists items, speed and memory problems occurring in folder browsing can be more efficiently solved. In detail, a server can receive the total number of folder lists items and the number of displayable folder lists items of a client, and the client can pull folder lists items corresponding to a desired number from the server using a navigation function, such as start, forward, backward, or end, and thus significantly increasing the processing speed. In addition, since the client pulls folder lists items corresponding to the desired number, a memory corresponding to the folder lists items can be assigned, and thus, when the folder lists items are pulled, a required memory space can be efficiently used.

In addition, in folder browsing for listing many files or folders, there is no problem on speed degradation or bulk memory space allocation, and files can be more efficiently searched on a screen using page down, page up, page start, or page end. In addition, since a division transfer is possible in a basis of the number of folder lists items displayable on the client, a problem of transfer number limitation can be solved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A dynamic folder browsing method using Bluetooth®, the method comprising the steps of:
   requesting, by a client, a server to set a path for folder browsing according to a pre-set profile;
   if the server supports a division transfer function at a path set time, transmitting a packet to pull folder lists items corresponding to a number displayable on a single screen according to the pre-set profile; and
   if the folder lists items corresponding to the number displayable on a single screen is received, displaying the received folder lists items on a browsing screen.

2. The method of claim 1, wherein the pre-set profile is a file transfer profile (FTP).

3. The method of claim 1, wherein the packet to pull folder lists items contains the number of folder lists items displayable on the browsing screen of the client.

4. The method of claim 1, further comprising receiving a packet containing a total number of folder lists items from the server after requesting the server to set a path.

5. The method of claim 4, wherein the client is a user device, and the server is a target device of the client.

6. The method of claim 1, further comprising:
   if a path with the server is set, transmitting, by the client, a packet for accessing a start point of the folder lists items to the server;
   receiving a packet containing the start point and folder lists items corresponding to the number displayable on the browsing screen from the start point from the server in response to the packet; and
   displaying a first page to display the received folder lists items.

7. The method of claim 1, further comprising:
   if a command for moving to a subsequent page is input from a user, transmitting, by the client, a packet for pulling subsequent folder lists items to the server; and
   receiving the subsequent folder lists items from the server and displaying the received folder lists items.

8. The method of claim 1, further comprising:
   if a command for moving to a previous page is input from a user, transmitting, by the client, a packet for pulling previous folder lists items to the server; and
   receiving the previous folder lists items from the server and displaying the received folder lists items.

9. The method of claim 1, wherein the folder lists items corresponding to the number displayable on a single screen are provided from the server through one of start, forward, backward, and end packets provided by the client.

10. A dynamic folder browsing system using Bluetooth®, the system comprising:
    a client for requesting to set a path for folder browsing according to a pre-set profile, transmitting a packet for pulling folder lists items corresponding to a number displayable on a single screen according to the pre-set profile, and displaying folder lists items corresponding to the number displayable on a single screen, which are received in response to the packet, on a browsing screen; and
    a server for determining whether a division transfer function is supported if a path set request is received from the client, transmitting a packet for requesting the number of folder lists items displayable on the client if the division transfer function is supported, and providing folder lists items corresponding to the displayable number to the client if a packet for pulling folder lists items corresponding to the number displayable on a single screen is received from the client.

11. The system of claim 10, wherein the pre-set profile is a file transfer profile (FTP).

12. The system of claim 10, wherein the packet to pull folder lists items contains the number of folder lists items displayable on the browsing screen of the client.

13. The system of claim 10, wherein the packet for asking the number of folder lists items displayable on the client contains the total number of folder lists items belonging to the server.

14. The system of claim 10, wherein the client is a user device, and the server is a target device of the client.

* * * * *